United States Patent [19]
Carlson

[11] 3,876,542
[45] Apr. 8, 1975

[54] LIQUID WASTES REDISTRIBUTION APPARATUS

[75] Inventor: Edwin R. Carlson, Eureka, Calif.

[73] Assignee: Neptune Microfloc, Incorporated, Corvallis, Oreg.

[22] Filed: Apr. 6, 1972

[21] Appl. No.: 241,740

[52] U.S. Cl. .............................................. 210/150
[51] Int. Cl. .............................................. C02c 1/04
[58] Field of Search .......... 55/90; 210/17, 150, 151; 261/95, 103, 112

[56] References Cited
UNITED STATES PATENTS

| | | | |
|---|---|---|---|
| 1,847,845 | 3/1932 | Mullen | 55/90 X |
| 2,424,248 | 7/1947 | Melvill | 261/95 |
| 3,112,261 | 11/1963 | Porter et al. | 210/17 |
| 3,143,498 | 8/1964 | Fordyce et al. | 210/151 X |
| 3,219,577 | 11/1965 | Powers | 210/17 |
| 3,231,490 | 1/1966 | Fry | 210/17 |
| 3,452,871 | 7/1969 | Hoover et al. | 210/150 |
| 3,496,101 | 2/1970 | Hay | 210/150 X |

Primary Examiner—Thomas G. Wyse
Attorney, Agent, or Firm—Warren, Rubin & Chickering

[57] ABSTRACT

An apparatus and method for the redistribution of liquid wastes discharged from a distribution means over a biological filter for the treatment of the wastes, particularly a filter comprised primarily of vertical surfaces, is disclosed. The apparatus includes a plurality of layers of horizontally disposed surfaces positioned between the distribution nozzles and the filter media, which surfaces intercept, retard and evenly distribute the liquid wastes prior to their flow down through the filter media. A maze-like flow channel construction is also disclosed to reduce surges in the flow rate caused by periodic impulses or discharges of liquid wastes, as is commonly encountered in rotary arm distribution apparatus.

5 Claims, 6 Drawing Figures

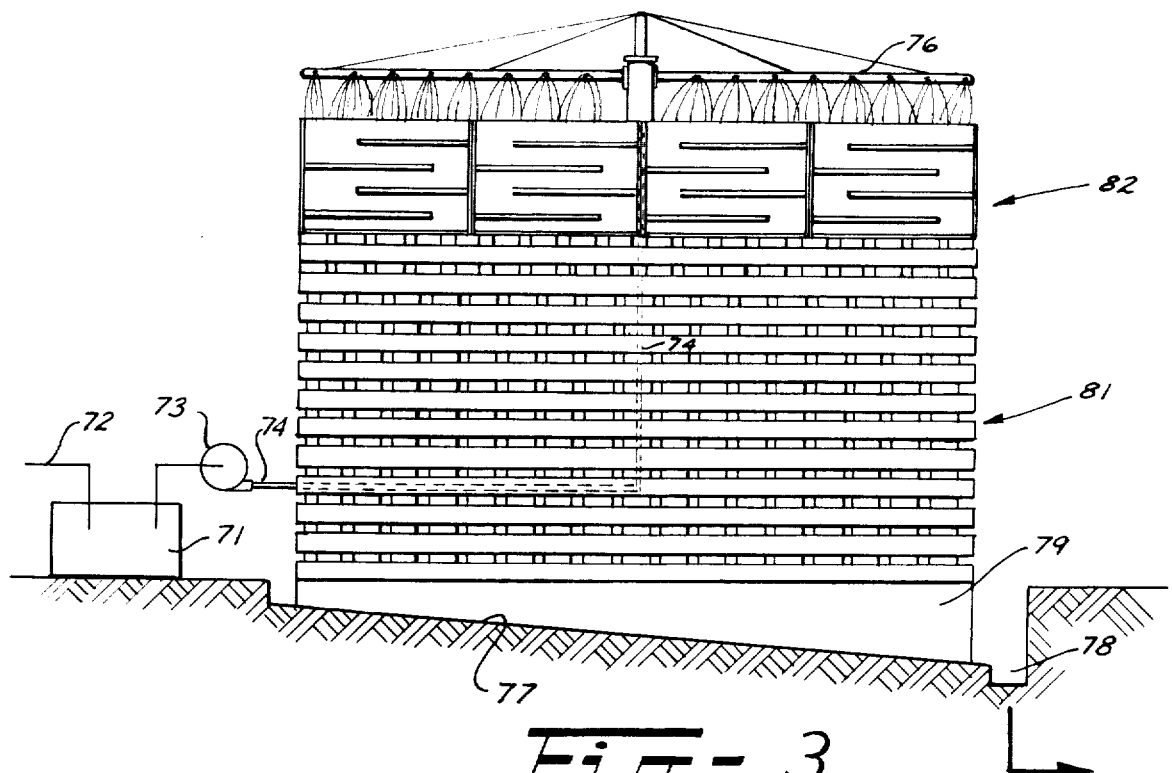
Fig-3
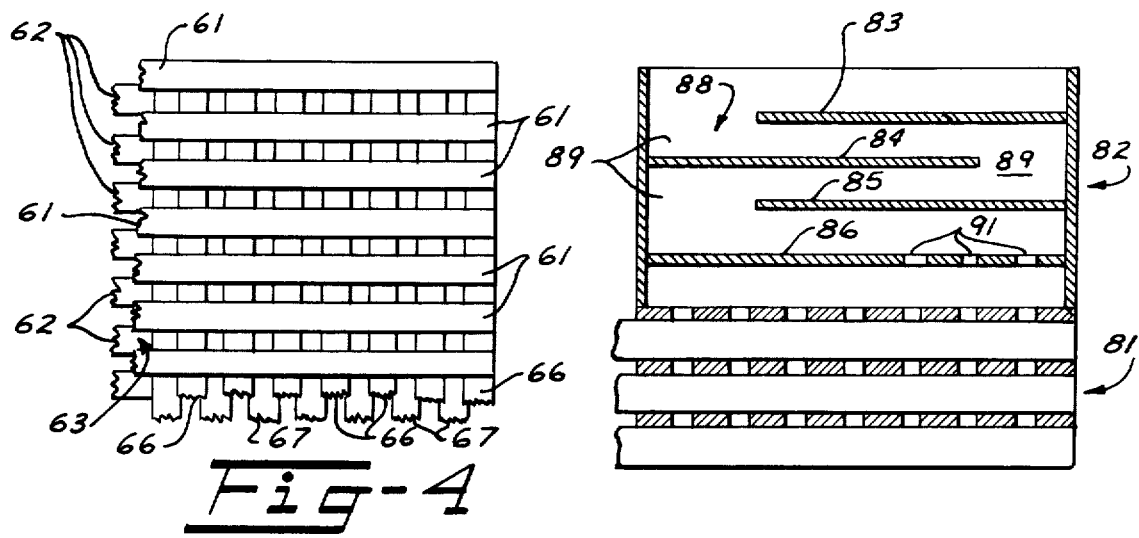
Fig-4
Fig-6
Fig-5

LIQUID WASTES REDISTRIBUTION APPARATUS

BACKGROUND OF THE INVENTION

The use of biological filters or habitats in the treatment of liquid wastes, such as sewage and industrial wastes, has become quite common and widespread. There are several different types of apparatus for the distribution of the liquid wastes over the biological habitat or filter media. Similarly, there are several different types of filter media and numerous methods of treatment and auxiliary apparatus used in connection with the biological filter.

Two of the most common approaches for the distribution of liquid wastes over a biological filter are through the use of fixed nozzles or stand pipes and the use of a movable (preferably rotary) arm or arms which periodically advance over the entire filter media. These types of distribution systems have various relative advantages and disadvantages, and both are in widespread use presently. In recent years, high-rate and low-rate trickling filters have been vastly improved by reason of the advent of new forms of filter media. Early biological habitats simply employed rock as the filter media over which the liquid wastes were distributed and on which the biological slimes grew. The new forms of filter media can be broadly classified into two groups, namely, vertical media and horizontal media. In the vertical media, virtually all of the surfaces providing the area over which the liquid wastes flow and on which the viological slimes grow are vertically extending. In the horizontal media, the primary growing surfaces are upwardly and/or downwardly facing horizontal surfaces. Additionally, the vertical media has most usually been formed of plastic material. An example of a typical vertical filter media construction is shown in U.S. Pat. No. 3,347,381. An example of a typical horizontal filter media is shown in U.S. Pat. No. 3,496,101. Whether these new forms of filter media are used as a replacement for rock in an existing biological filter system or are employed in specially designed and newly constructed filters, several problems have been encountered which reduce the effectiveness of these media as employed as a habitat in biological filters. The problems have been heightened substantially when vertical media is employed, but exist to some extent in connection with horizontal media and certain distribution systems.

In a fixed nozzle liquid wastes distribution system, achievement of a uniform distribution of the liquid wastes over the top of the filter media is quite difficult. This problem of an uneven distribution is caused, in large part, by the fact that the rate at which sewage is discharged over the filter may vary substantially from day-to-day and within the day, causing large changes in the flow rate out the fixed stand pipes or nozzles and changes in the area over which the nozzles disperse the liquid wastes. The problem with fixed stand pipes is further heightened when vertical media is used in that the vertical channels tend to maintain the flow of liquid wastes in the predetermined vertical channels into which the wastes entered at the top of the filter. Thus, although the vertical media is usually staggered, the lateral distribution or dispersion of the liquid wastes is relatively minimal as it travels in vertical channels from the top of the filter to the bottom.

When a rotary arm distribution system is used, the liquid wastes are more evenly distributed over the top of the filter by reason of the constant motion of the rotary arm over all portions of the filter. The changes in flow rate or loading of the filter tend to affect all portions of the filter in the same way and do not create dry spots and attendant failure in the growth of biological slimes. Accordingly, rotary arm distribution means are preferred when vertical channel plastic filter media is employed. The rotary arm apparatus, however, creates a different but related problem. As the rotary arm passes over a portion of the filter, there is a tremendous surge or pulse in the flow rate of liquid wastes over that portion of the filter onto which the wastes have been discharged by means of the rotary arm. Again, the vertical media is particularly adversely affected by the surge encountered when rotary arm distribution means are employed. The high flow rate combines with the vertical channel to build up a substantial velocity of liquid sewage in the vertical channels of the media, with the result that biological slimes do not grow effectively and are eroded from the upper surfaces of the filter media. One solution to this problem has been to construct the media to a very substantial height, for example, as high as 21 feet or more. In such a construction, a portion of the upper filter area, when a rotary arm distribution means is employed, may not contain any substantial quantity of biological slimes, since the flow rate of liquid sewage surging from the rotary arm at the upper elevations in the filter media is too high to allow biological growth. Similarly, although to a lesser extent, horizontal media may have its upper surfaces eroded and washed free of biological slimes as a result of the surge from the rotary arm distribution apparatus. Typical rotary arm distribution means are shown in U.S. Pat. Nos. 2,168,208 and 2,355,640, while typical fixed-nozzle liquid wastes treatment apparatus may be seen in U.S. Pat. Nos. 3,112,261 and 3,496,101.

Accordingly, it is an object of the present invention to provide a liquid wastes redistribution apparatus which will effect an even distribution of liquid wastes over the top of a biological habitat for a wide range of filter load rates and tend to reduce the surges in flow rate onto the habitat.

It is another object of the present invention to provide a liquid wastes redistribution apparatus which may be readily employed with a variety of distribution means and filter media constructions at either existing or new installations.

Another object of the present invention is to provide a liquid wastes redistribution apparatus which is easy to construct, install, operate and maintain.

Still another object of the present invention is to provide a liquid wastes treatment apparatus which increases the durability of the combined filter and redistribution system, affords cost savings in the construction of the filter media and operation of the filter, and improves the overall filter strength.

Other objects and advantages of the liquid wastes redistribution apparatus of the present invention will become apparent and are set out in more detail in connection with the description of the preferred embodiments.

SUMMARY OF THE INVENTION

The apparatus of the present invention is comprised, briefly, of a liquid wastes distribution media positioned between the top of biological filter media and distribution discharge outlets. The redistribution media is formed with a plurality of vertically spaced and superimposed layers of upwardly facing substantially horizontal surfaces with openings therethrough for downward flow of the liquid wastes to the filter media. The horizontal surfaces are formed and arranged to interrupt, retard and redistribute the liquid wastes and may include, as one aspect of the invention, a maze-like flow channel to reduce surges in filter loading. Lath-like horizontally oriented, relatively spaced, side-by-side members preferably provide the redistribution media, and the layers of members may be relatively staggered and/or oriented in an intersecting manner to eliminate vertical channels.

DESCRIPTION OF THE DRAWINGS

FIG. 3 is a side elevational view of the redistribution apparatus of the present invention installed on horizontal media and used with a rotary arm distribution means.

FIG. 4 is an enlarged, top plan view of liquid wastes redistribution apparatus constructed in accordance with the present invention.

FIG. 5 is a side elevational view of the redistribution apparatus shown in FIG. 4.

FIG. 6 is an enlarged, side elevational view, in cross-section, of the alternative embodiment of the redistribution apparatus of the present invention shown in FIG. 3 and constructed to control surging.

DESCRIPTION OF THE PREFERRED EMBODIMENT

Figure 1:
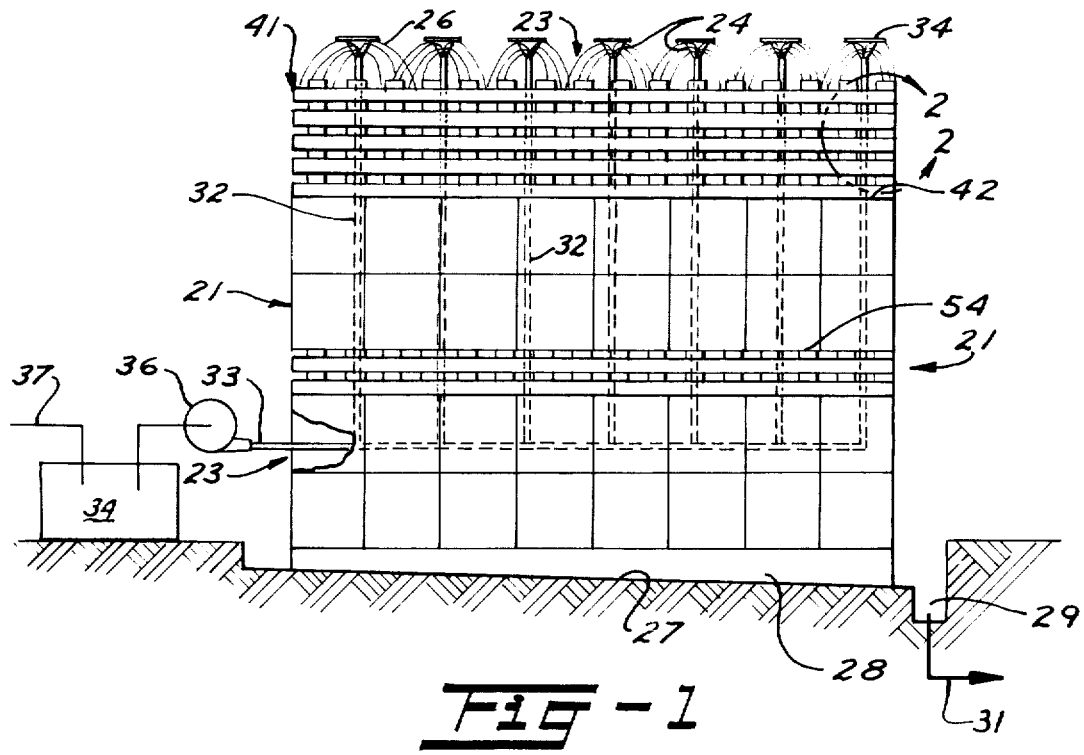
FIG. 1 is a side elevational view of a schematic representation of a biological filter having a redistribution apparatus constructed in accordance with the present invention installed thereon.

The liquid wastes redistribution apparatus and method of the present invention may be conveniently used with conventional biological filter apparatus, as shown in FIG. 1. The liquid wastes treatment apparatus shown in FIG. 1 includes a filter media, generally designated 21, having a plurality of surfaces, shown in FIG. 2 as being vertically extending surfaces 22, which provide a biological habitat over which liquid wastes flow and on which biological slimes grow. Additionally, distribution means, generally designated 23, is provided with distribution outlets 24, positioned over the top of media 21 for discharge of liquid wastes 26 on the top of the media and gravitation of the liquid wastes down through the media.

Additionally, the biological filter will normally contain a collecting basin or under-drain 27 on which media 21 is supported by a plurality of foundation runners 28, which allow flow of liquid wastes on the sloping under-drain 27 to collection basin 29 for gravitational or pumped flow (schematically represented by arrow 31) to other treatment apparatus, such as clarifiers and the like. Sewage distribution means 23 includes vertical stand pipes 32 on which distribution outlets or nozzles 24 are mounted and which stand pipes are supplied by supply pipe 33. The liquid wastes are preferably pumped from a tank or basin 34, which may be a primary clarifier, or a mixing basin. Pump 36 withdraws the liquid sewage from basin 34 and conduit 37 supplies the basin either from a clarifier or after screening.

The liquid wastes treatment apparatus thus far described is in widespread use, and there are numerous variations commonly employed in connection with such apparatus, including changes in piping configurations, pumping or gravitational flow, and collection basin geometries. Additionally, other forms of fixed nozzle distribution means have been employed, such as systems in which the stand pipes 32 in the filter media are eliminated and an overhead supply system employed. Additionally, the use of movable or rotary arm distribution systems will be described in more detail in connection with the apparatus of FIG. 3.

In order to insure an even distribution of liquid wastes over the top of filter media 21, the apparatus of the present invention includes a liquid wastes redistribution media, generally designated 41, positioned between the top 42 of filter media 21 and beneath discharge outlets 24 of distribution means 23. As best may be seen in FIG. 2, filter media 41 is formed with a plurality of vertically spaced and superimposed layers 46–50 of upwardly facing substantially horizontally extending surfaces 52 formed to define openings 53 therethrough for the downward flow of liquid wastes from outlets 24 through the redistribution media to filter media 21. Thus, as the liquid wastes 26 hit layer 50 of the redistribution media, horizontal surfaces 52 cause the downward flow of the liquid waste to be interrupted and retarded with a redistribution in a lateral direction of a portion of the wastes. As the wastes progress downwardly under the action of gravity, each successive layer tends to further disperse or laterally redistribute the liquid wastes and to slow down their downward flow so that by the time the wastes have reached media 21, their downward flow is greatly reduced and more evenly distributed over the plan area of top 42 of the media. When evenly distributed over the vertical media, the undesirable effect of channeling the liquid wastes in individual vertical channels, as defined by surfaces 22 in the filter media, it is not as significant since the flow in each channel is now more nearly equal. Additionally, and very importantly, the retarding effect of the horizontal surfaces in the redistribution media will cause the liquid sewage to have a much lower downward velocity. This in turn results in vertically extending surfaces 22 in the filter media adjacent top 42 being able to support and retain biological slimes and act as an effective viological habitat. Thus, the redistribution media tends to eliminate erosion off the upper surfaces of the vertical channels in filter media 21. Accordingly, a foot or even less of redistribution layers can be used with vertical plastic media in a filter which lower in height without decreasing substantially the filter performance. The importance of such a reduction in the plastic filter media height is twofold. First, the reduction in filter height will have an attendant savings in cost of media. Additionally, increased filter height normally requires increased pumping cost in order to pump the liquid wastes to a height where they may be distributed over the filter media. Accordingly, a savings in filter media height results in an attendant savings in pumping cost.

While the redistribution media of the present invention may be most advantageously employed as positioned over the top of the filter media, it may also be positioned within the filter media. As above noted, the vertical channels in plastic media confine the liquid sewage to a single downwardly extending path. The effect is to maintain a relatively high velocity in the downward flow of the liquid wastes and to eliminate lateral movement of the wastes within the filter media. Accordingly, several layers of redistribution media may be positioned at various levels throughout the vertical height of filter media 21 in order to slow the downward velocity of the liquid wastes and to further redistribute and even out the flow in each vertical channel of the plastic media. Since plastic vertical media is typically manufactured in cube-like units which are self-supporting and stacked on one another, it is a simple matter to intersperse the filter media with layers of redistribution media. In FIG. 1 such an intermediate zone of layers of redistribution media within filter media 21 is shown at zone 54.

Redistribution media 41 may be constructed of a number of different materials and arrays of horizontally extending surfaces. It has been found to be preferably and advantageous, however, to employ a media, which has been found to be effective as a horizontal filter media, as the redistribution media. Such a media is set forth and described in detail in U.S. Pat. No. 3,496,101. Briefly, this redistribution media is provided by lath-like members 56 which provide upwardly facing surfaces 52 and downwardly facing surfaces 57. The members 56 are positioned in the layers of the redistribution media in side-by-side and generally parallel and spaced apart relation to define openings 53 therebetween. Members 56 are supported on cross members or supporting members 58, usually by the use of fasteners or adhesives. The redistribution media may be formed of wood, such as redwood or pressure treated fir, and additionally may be formed of plastic material. Since the primary purpose of the redistribution media is not to afford a biological habitat, but rather to redistribute and retard the downward flow of the liquid wastes, the redistribution media need not be constructed or positioned in a manner designed to optimize its effectiveness as a biological habitat.

Figure 2:
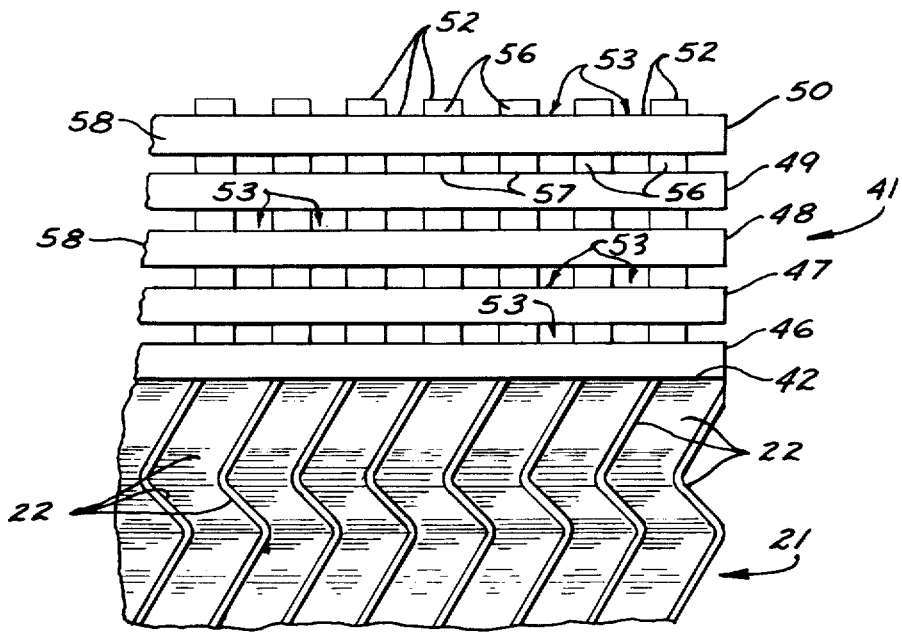
FIG. 2 is an enlarged, fragmentary, cross-sectional view of that area of the apparatus of FIG. 1 encircled by line 2—2.

In order to minimize the number of layers which may be required in the redistribution media in order to effect evening out and retardation of flow of the liquid wastes, it is a further feature of the present invention that the layers of redistribution media may be relatively horizontally displaced in relation to the next vertically adjacent layer to superimpose horizontal surfaces over openings in the adjacent layers. This may best be seen by reference to FIG. 4 wherein lath-like members 61 form the top layer in the redistribution media and lath-like members 62 form the third layer in the media. As will be seen, laths 62 are in superimposed relation to the openings 63 between laths 61. Thus, by horizontally displacing layer three relative to layer one, in the media of FIG. 4, the laths in the third layer are aligned with the openings in the first layer of the media. In FIG. 2 laths 56 are all superimposed over each other, as are openings 53, creating the possibility that liquid wastes may fall down openings 53 without impacting any of the laths. In FIGS. 4 and 5 the second and fourth layers of laths have been perpendicularly oriented to the first and third layers such that the longitudinal axes of laths 66 in the second layer of FIGS. 4 and 5 are perpendicular to the longitudinal axes of laths 61 and 62. Similarly, the longitudinal axes of laths 67 are perpendicular to the axes of 61 and 62. Additionally, the layers includings laths 66 and 67 are also relatively horizontally displaced so that the laths are superimposed with the openings. Thus, the orientation of the layers and their relative positioning in FIGS. 4 and 5 result in there being no uninterrupted vertical channel down which liquid waste may travel before imparting the filter media.

While it has been found that this staggering and crisscrossing of layers of media is undesirable if the entire filter is to be constructed of horizontal media, the staggering and crisscrossing of media is highly desirable when the media is used as a redistribution media, since its primary function is not as a biological habitat. It should also be noted that the alignment of laths as shown in FIG. 2 may require a few more layers in order to insure an evening of the downward flow over a given horizontal area, this alignment works in a satisfactory fashion in most instances and is a substantial improvement over discharge of the liquid wastes directly on the top of the vertical filter media. This is particularly true since there is considerable splashing off of the horizontal surfaces. Thus, a relatively small depth of redistribution media compared to the depth of filter media virtually eliminates the opportunity for liquid wastes to pass down the channels defined by openings 53. A further height reduction in the redistribution media can be accomplished, however, by staggering and crisscrossing the layers.

The use of a redistribution media as above described has several additional advantages attendant thereto. First, a common problem encountered with plastic media, whether vertical or horizontal, is that it checks and breaks down under ultraviolet light on the top surfaces which are exposed to the sunlight. Use of a redistribution media, particularly if it is a wood media, will eliminate the exposure to sunlight and this breakdown of the plastic filter media. Additionally, and very important, biological filters must often be walked upon by installation and maintenance personnel. Thus, the filter media is subject to localized loading which is much greater than would be experienced in merely supporting the weight of the media above it. Thus, plastic media has not infrequently been crushed by personnel installing the same or at a later date working upon the media. One approach to avoid the problem has been the use of portable walkways, such as boards and the like which are removed after installation and/or maintenance. Another approach has been to cover the entire top 42 of media 21 with a single perforated sheet having enough strength to transfer localized loads over a greater surface area. The redistribution media of the present invention can be formed of a relatively heavy gauge material which can be readily walked upon and will transfer localized loads over a substantial surface area. Thus, the need for a self-supporting plastic media which further is formed to support localized loads can be eliminated, and the plastic media can be manufactured out of a thinner gauge material. Thus, the use of redistribution media of the present invention can result in a substantial cost savings in the ability to reduce the gauge of the material in the filter media. It might be noted further that since the redistribution media is preferably of a relatively heavy gauge, it may be constructed of plastic material which the untraviolet light from the sun will check and cause to break down, but which can be sufficiently strong so that the loss in mechanical strength from the sunlight is not significant.

The redistribution media of the present invention, therefore, has the effect of reducing the cost of the filter media and increasing the overall strength and durability of the biological filter.

Referring now to FIGS. 3 and 6, an alternative embodiment of the redistribution media of the present invention may be described. In FIG. 3 a schematic representation of the biological filter system is illustrated in which incoming liquid wastes enter tank 71 through conduit 72 and are pumped by pump 73 through conduit 74 to a rotary arm-type of distribution means 76. The rotary arm distribution means is fairly effective in evenly distributing the liquid wastes over the top surface of the filter media, but as above described, the primary defect of such distribution apparatus is that they cause surges or impulses in the flow rate over the filter media. In a manner similar to that previously described in connection with FIG. 1, the biological filter is provided with an underdrain 77 including a collecting basin 78 from which filter under-drain flow may be pumped for further treatment. Mounted on underdrain 77 are runners 79 and a filter media, generally designated 81. Superimposed over filter media 81 is a redistribution media, generally designated 82.

In order to act as a surge control apparatus, the redistribution media of the present invention may be formed with the horizontallly upwardly facing surfaces oriented and constructed in a manner resulting in a substantial delay and slowing of the downward progress of the liquid wastes through the redistribution media. Thus, as best may be seen in FIG. 6, redistribution media 82 includes upwardly facing surfaces 83-86, with surface 83 defining an inlet opening 88 and the remaining surfaces defining a maze-like flow channel 89 formed to impart a horizontal component to the direction of flow of the liquid wastes deposited over the redistribution media. The redistribution maze is formed with a discharge opening, or in this case openings 91, for flow of the liquid wastes onto the top surface of filter media 81. The redistribution media of FIGS. 3 and 6 can be formed of lath-like members, for example by positioning members 56 in FIG. 2 in abutting relation, but is preferably formed as shown in FIG. 6.

The filter media illustrated in FIG. 6 is illustrated as horizontal media of the type disclosed in U.S. Pat. No. 3,496,101 and of the type that may be employed as a redistribution media, as illustrated in FIG. 2. Since horizontally extending filter media tends to redistribute the liquid wastes as they travel down through the filter, location of the discharge openings 91 in the redistribution media over only a portion of the top surface of the filter media is not too critical.

When a rotary arm distribution means is employed, the surge as the arm passes over a unit of redistribution media is quite substantial. This is particularly true at the outer ends of the rotary arm, where the volume and velocity of liquid wastes must be greater in light of increased speed at which the arm passes over an area. Accordingly, in order to slow the surge and even out the flow, the partitions 84 and 85 in media 82 cause the direction of flow of the liquid wastes to be reversed several times and the flow rate correspondingly reduced over the peak rate at which flow was discharged from the distribution means 76 onto the upper surface 83 of the redistribution media. It is preferable in order to reduce the downward flow rate and spread the time over which the liquid wastes are discharged on the filter media to construct the redistribution media with a flow channel 89 which has a greater horizontal than vertical length. Thus, the flow channel as illustrated in FIG. 6 is substantially longer in the horizontal direction than the height of the redistribution media.

In order to both control surging and obtain an even distribution, it is possible to combine the redistribution media construction shown in FIG. 2 with the redistribution media construction shown in FIG. 6. Therefore, if what has heretofore been described as filter media 81 in FIG. 6 was merely layers of redistribution media which in turn were superimposed over a vertical filter media such as media 21, as shown in FIG. 2, both surge control and even distribution can be achieved. This approach is particularly advantageous when vertical filter media is employed since discharge openings 91 will tend to cause preferential flow of the liquid wastes from the surge controlling flow channel 89. It should be noted that the inlet opening 88 and the flow channel throughout its length, as well as discharge openings 91, must be of substantial dimension in order to avoid plugging by solids carried in the liquid wastes. Accordingly, the first discharge opening 91 must be of substantial dimension and will, for that reason, be the opening from which most of the liquid wastes are discharged from the redistribution means. This phenomenon is precisely the problem which has been encountered in connection with prior redistribution systems which have been employed. If a single perforated sheet is attempted to be used to evenly disperse liquid wastes over a given area of filter, the holes must be relatively small in order to insure an even distribution. When the holes are small, however, they plug, and when the holes are large enough to avoid plugging, they result in preferential discharge onto the filter media and uneven distribution.

In the redistribution media and method of the present invention, the horizontal orientation of surfaces to cause an impacting or impinging of the liquid wastes thereon for retardation of the downward flow of such wastes is of substantial importance. Obviously, some skewing or tilting from a perfectly horizontal position cna be tolerated with the redistribution media being effective both in retarding and in redistributing the liquid wastes. If, by contrast, vertical media of the type of media 21 in FIG. 2 is attempted to be employed, however, neither retardation nor horizontal dispersement of the liquid wastes is accomplished.

As will be obvious, several forms of maze-like channels can be employed to spread the time of discharge over the filter media out over that which is the result of the rotary arm. Additionally, the length of the maze-like flow channel can be increased in accordance with the desired delay and normal operating conditions of the biological filter. In connection with a maze-like channel, the surfaces need not be so nearly horizontal if the effect is to delay and even out the flow over the media with respect to time.

I claim:

1. In a liquid wastes treatment apparatus including a trickling filter media having a plurality of vertically extending surfaces providing a biological habitat for the treatment of said liquid wastes and distribution means including discharge outlets positioned over said filter media for discharge of said liquid wastes on said media for gravitation therethrough, the improvement comprising:

a liquid wastes redistribution media positioned between the top of said filter media and beneath said discharge outlets, said redistribution media being of relatively small depth compared to said filter media and formed with a plurality of vertically spaced and superimposed layers of upwardly and downwardly facing substantially horizontally extending surfaces of substantial area and connecting vertically extending surfaces of substantially less area than said horizontally extending surfaces, said horizontally extending surfaces being formed to define openings therethrough for the downward flow of said liquid wastes from said outlets through said redistribution media to said filter media with said horizontally extending surfaces interrupting, retarding and redistributing said liquid wastes as said liquid wastes pass from one layer to the next vertically adjacent layer of said redistribution media.

2. The liquid wastes treatment apparatus as defined in claim 1 wherein, said surfaces in said redistribution media are provided by surfaces on elongated lath-like members, and at least one of said layers of said redistribution media is positioned with the longitudinal axes of said lath-like members in said layer transverse to the longitudinal axes of said lath-like members in a vertically adjacent layer.

3. The liquid wastes treatment apparatus as defined in claim 1 wherein said distribution means includes movable outlets periodically passing over portions of said filter media, and the further improvement of:

said upwardly facing horizontally extending surfaces in said redistribution media are arranged to form an inlet opening, a maze-like flow channel communicating with said inlet opening and formed to impart a horizontal component to the direction of flow of said liquid wastes therethrough and change the direction of flow of said liquid wastes prior to discharge thereof onto said filter media, and a discharge opening whereby the flow rate of said liquid wastes from said discharge opening is reduced below the flow rate during surges from said outlets.

4. The liquid wastes apparatus as defined in claim 3 wherein, said flow channel has a greater horizontal length than vertical length and said flow channel reverses the direction of flow of said liquid wastes by 180° a plurality of times.

5. The liquid wastes treatment apparatus as defined in claim 1 and, a zone of redistribution media positioned intermediate of the height of said filter media, said zone being comprised of a plurality of layers of redistribution media formed with upwardly facing substantially horizontally extending surfaces.

* * * * *